US011618818B2

United States Patent
Ma et al.

(10) Patent No.: US 11,618,818 B2
(45) Date of Patent: Apr. 4, 2023

(54) FUNCTIONALIZED ETHYLENE/ALPHA-OLEFIN INTERPOLYMERS WITH HIGH GRAFT LEVELS

(71) Applicant: Dow Global Technologies LLC, Midland, MI (US)

(72) Inventors: Wanfu Ma, Shanghai (CN); Santosh S. Bawiskar, Sugar Land, TX (US); Yi Jin, Missouri City, TX (US); Ling Zhang-watson, Missouri City, TX (US); Allan Walter Mclennaghan, Lachen (CH); Olaf Henschke, Huenenberg See (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/047,065

(22) PCT Filed: Apr. 12, 2018

(86) PCT No.: PCT/CN2018/082781
§ 371 (c)(1),
(2) Date: Oct. 12, 2020

(87) PCT Pub. No.: WO2019/196051
PCT Pub. Date: Oct. 17, 2019

(65) Prior Publication Data
US 2021/0198473 A1 Jul. 1, 2021

(51) Int. Cl.
*C08L 51/06* (2006.01)
*C09J 151/06* (2006.01)

(52) U.S. Cl.
CPC .............. *C08L 51/06* (2013.01); *C09J 151/06* (2013.01); *C08L 2205/03* (2013.01)

(58) Field of Classification Search
CPC .... C08F 255/02; C09J 151/06; C09J 151/003; C09J 2451/06; C08L 51/06; C08L 2351/06
See application file for complete search history.

(56) References Cited

U.S. PATENT DOCUMENTS

| | | | |
|---|---|---|---|
| 5,466,555 A * | 11/1995 | Taguchi | G03G 9/08782 430/108.4 |
| 7,125,929 B2 | 10/2006 | Ward | |
| 8,076,407 B2 | 12/2011 | Ellis et al. | |
| 2005/0256263 A1 | 11/2005 | Ward | |
| 2006/0173135 A1 | 8/2006 | Devlin et al. | |
| 2010/0196819 A1* | 8/2010 | Song | G03G 15/6573 430/126.1 |
| 2014/0227535 A1 | 8/2014 | Sundaram et al. | |
| 2015/0166853 A1 | 6/2015 | Chen et al. | |
| 2015/0361315 A1* | 12/2015 | Karjala | C08F 255/00 524/504 |
| 2017/0114257 A1 | 4/2017 | Hussein et al. | |
| 2017/0292045 A1 | 10/2017 | Chen et al. | |

FOREIGN PATENT DOCUMENTS

| | | |
|---|---|---|
| CN | 1922281 | 2/2007 |
| CN | 101747576 | 6/2010 |
| EP | 2363420 | 9/2011 |
| JP | 200652246 A | 2/2006 |
| WO | 2007146875 A3 | 4/2008 |
| WO | 2008097898 | 8/2008 |
| WO | 2014042683 | 3/2014 |
| WO | 2014042815 | 3/2014 |
| WO | 2016028909 | 2/2016 |
| WO | 2017058627 | 4/2017 |
| WO | 2018071507 | 4/2018 |
| WO | 2018102148 | 6/2018 |

OTHER PUBLICATIONS

PCT/CN2018/082781, Search Report and Written Opinion dated Jan. 18, 2019.

* cited by examiner

*Primary Examiner* — Jeffrey C Mullis

(57) ABSTRACT

A composition comprising an acid and/or anhydride grafted ethylene/alpha-olefin interpolymer that comprises the following properties: A) number of grafts per polymer chain≥1.80, and B) melt viscosity (at 177° C.)≤50,000 mPa·s.

17 Claims, 1 Drawing Sheet

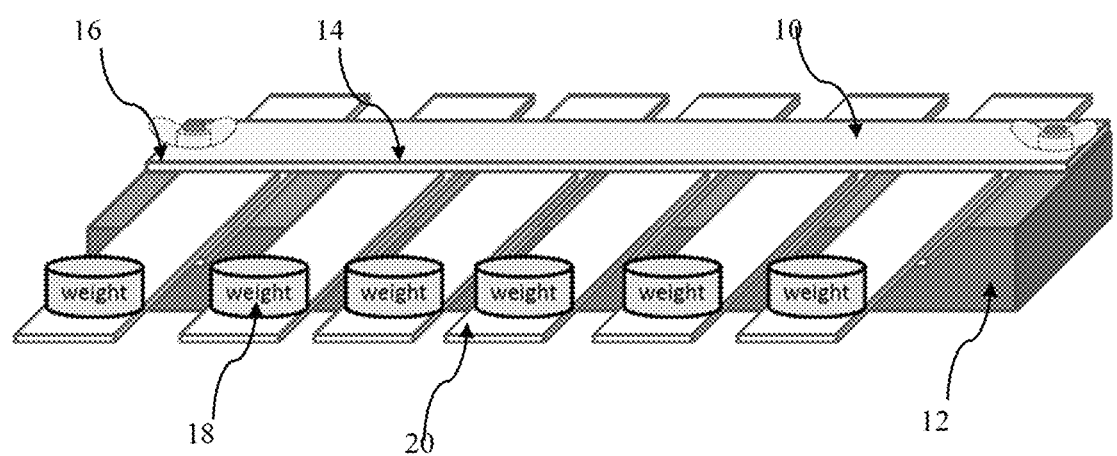

FUNCTIONALIZED ETHYLENE/ALPHA-OLEFIN INTERPOLYMERS WITH HIGH GRAFT LEVELS

BACKGROUND

The demand for surface treated and coated packaging has increased. Surface treated and coated cardboards have become more common in the packaging industry. Such cardboards are usually coated with glossy oil printing, or wax, or bi-axially oriented polypropylene (BOPP) on the surface, which results in a surface with very low or no porosity. These cardboards are called "hard to bond" substrates in the industry. Incumbent hot melt adhesives (HMA), based on either metallocene or other "single site catalyzed" olefin-based polymers, or EVA, have been demonstrated to have limited adhesion to these hard to bond substrates. There is a need for developing new HMA formulations that have improved adhesion to such "hard to bond" substrates.

Adhesive compositions and/or functionalized polymers are described in the following references: WO2007146875, WO2008097898, WO2014042815, US20150166853, WO2016028909, WO2017058627, US20170114257, International Application PCT/US17/056090, filed on Oct. 11, 2017 and International Application PCT/US17/062161, filed on Nov. 17, 2017. However, as discussed above, there is a need for new HMA formulations that have improved adhesion to such "hard to bond" substrates. This need has been met by the following invention.

SUMMARY OF THE INVENTION

A composition comprising an acid and/or anhydride grafted ethylene/alpha-olefin interpolymer that comprises the following properties:
A) number of grafts per polymer chain≥1.80, and
B) melt viscosity (at 177° C.)≤50,000 mPa·s.

BRIEF DESCRIPTIONS OF THE DRAWINGS

The FIGURE depicts a schematic of the test samples and test configuration for the Heat Stress test method.

DETAILED DESCRIPTION

New adhesive compositions have been discovered that have improved adhesion to UV varnished (UV cured coating) substrate and dense corrugated cardboard, as compared to conventional EVA based formulations, or conventional HMA formulations based on functionalized or non-functionalized ethylene/alpha olefin interpolymers.

As discussed above, a composition is provided that comprises an acid and/or anhydride grafted ethylene/alpha-olefin interpolymer that comprises the following properties:
A) number of grafts per polymer chain≥1.80, and
B) melt viscosity (at 177° C.)≤50,000 mPa·s.

The composition may comprises a combination of two or more embodiments described herein.

The acid and/or anhydride grafted ethylene/alpha-olefin interpolymer may comprises a combination of two or more embodiments described herein.

In one embodiment, or a combination of embodiments described herein, the acid and/or anhydride grafted ethylene/alpha-olefin interpolymer is an acid and/or anhydride grafted ethylene/alpha-olefin copolymer. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, has a density≥0.855 g/cc, or ≥0.860 g/cc, or ≥0.865 g/cc, or ≥0.870 g/cc (1 cc=1 cm$^3$). Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, has a density≤0.900 g/cc, or ≤0.895 g/cc, or ≤0.890 g/cc, or ≤0.885 g/cc (1 cc=1 cm$^3$). Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, has a density from 0.855 to 0.900 g/cc, or from 0.860 to 0.890 g/cc, or from 0.865 to 0.885 g/cc. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, has a melt viscosity (177° C.)≥5,000 mPa·s, or ≥6,000 mPa·s, or ≥7,000 mPa·s, or ≥8,000 mPa·s, ≥9,000 mPa·s, or ≥10,000 mPa·s, or ≥12,000 mPa·s. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, has a melt viscosity (177° C.)≤45,000 mPa·s, or ≤40,000 mPa·s, or ≤35,000 mPa·s, or ≤30,000 mPa·s, or ≤25,000 mPa·s. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, has a melt viscosity (177° C.)≤28,000 mPa·s, or ≤26,000 mPa·s, or ≤24,000 mPa·s, or ≤22,000 mPa·s. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, has a melt viscosity (177° C.) from 5,000 to 30,000 mPa·s, or from 10,000 to 28,000 mPa·s, or from 12,000 to 26,000 mPa·s, or from 14,000 to 24,000 mPa·s, or from 16,000 to 22,000 mPa·s. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, is an anhydride grafted ethylene/alpha-olefin interpolymer, and further copolymer. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, is a maleic anhydride grafted ethylene/alpha-olefin interpolymer, and further copolymer. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, is present in an amount ≥5 wt %, or ≥10 wt %, or ≥15 wt % based on the weight of the composition. In one embodiment, or a combination of embodiments described herein, the acid and/or anhydride grafted ethylene/alpha-olefin interpolymer, and further copolymer, is present in an amount≤60 wt %, or ≤55 wt %, or ≤50 wt %, or ≤45 wt %, based on the weight of the composition. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, has ≥1.85, or ≥1.90, or ≥1.95, or ≥2.00 grafts per polymer chain. Here the term "grafts" refer to the grafted acid and/or anhydride functionalization agent. In one embodiment, or a combination of embodiments described herein, the acid and/or anhydride grafted ethylene/alpha-olefin interpolymer, and further copolymer, has ≤5.00 or ≤4.50, or ≤4.00 or ≤3.50 grafts per polymer chain. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, has ≥1.0, or ≥1.2, or ≥1.4 or ≥1.8 wt % grafted acid and/or anhydride groups, based on the total weight of the interpolymer, or copolymer. In one embodiment, or a combination of embodiments described herein, the acid and/or anhydride grafted ethylene/alpha-olefin interpolymer, and further copolymer, has ≤6.0 or ≤5.5, or ≤5.0 or ≤4.5 grafted acid and/or anhydride, based on the total weight of the interpolymer, or copolymer. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, has a number average molecular weight (Mn)≥5,000 g/mole, or ≥6,000 g/mole, or ≥7,000 g/mole, or ≥8,000 g/mole, ≥9,000 g/mole, or ≥10,000 g/mole. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, has a number average molecular weight (Mn)≤50,000 g/mole, or ≤45,000 g/mole, or ≤40,000 g/mole, or ≤35,000 g/mole, or ≤30,000 g/mole, or ≤25,000 g/mole, or ≤20,000 g/mole, or ≤15,000 g/mole. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, has a molecular weight distribution (Mw/Mn)≥1.80, or ≥1.90, or ≥2.00, or ≥2.10. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, has a molecular weight distribution (Mw/Mn)≤3.00, or ≤2.80, or ≤2.60, or 2.40. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the acid and/or anhydride grafted ethylene/alpha-olefin interpolymer, and further copolymer, is present in an amount≥95 wt %, or ≥98 wt %, or ≥99 wt % based on the weight of the composition. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

In one embodiment, or a combination of embodiments described herein, the composition further comprises a tackifier. The tackifier includes, but not limited to, aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures of two or more of these tackifiers.

In one embodiment, or a combination of embodiments described herein, the composition further comprises a wax. The wax includes, but not limited to, paraffin wax, microcrystalline wax, high density, low molecular weight polyethylene wax, polypropylene wax, thermally degraded wax, by-product polyethylene wax, Fischer-Tropsch wax, oxidized Fischer-Tropsch wax, and functionalized wax, such as hydroxyl stearamide wax and fatty amide wax or a mixture thereof.

In one embodiment, or a combination of embodiments described herein, the composition further comprises a non-functionalized ethylene/alpha-olefin interpolymer, and further a non-functionalized ethylene/alpha-olefin copolymer.

In one embodiment, the composition further comprises a second acid and/or anhydride grafted ethylene/alpha-olefin interpolymer, and further copolymer, and wherein the two interpolymers (or copolymers) differ in one or more properties, such as melt viscosity (177 C), density, Mn, or Mw/Mn.

In one embodiment, or a combination of embodiments described herein, the composition has a melt viscosity (177° C.)≥500 mPa·s, or ≥600 mPa·s, or ≥700 mPa·s, or ≥800 mPa·s, ≥900 mPa·s, or ≥1,000 mPa·s. In one embodiment, or a combination of embodiments described herein, the composition has a melt viscosity (177° C.)≤5,000 mPa·s, or ≤4,500 mPa·s, or ≤4,000 mPa·s, or ≤3,500 mPa·s, or ≤3,000 mPa·s, or ≤2,500 mPa·s, or ≤2,000 mPa·s, or ≤1,500 mPa·s.

In one embodiment, or a combination of embodiments described herein, the composition has a Heat Stress≥40° C., or ≥45° C., or ≥50° C., or ≥55° C., ≥60° C. In one embodiment, or a combination of embodiments described herein, the composition has a Heat Stress≤95° C., or ≤90° C., or ≤85° C., or ≤80° C., or ≤75° C.

In one embodiment, or a combination of embodiments described herein, the composition has a Fiber Tear (at −20° C.) from 70% to 100%, or from 75% to 100%, or from 80% to 100%, or from 85% to 100%, or from 90% to 100%.

In one embodiment, or a combination of embodiments described herein, the composition has a Fiber Tear (at 23° C.) from 70% to 100%, or from 75% to 100%, or from 80% to 100%.

In one embodiment, or a combination of embodiments described herein, the composition has a Fiber Tear (at 60° C.) from 70% to 100%, or from 75% to 100%, or from 80% to 100% or from 85% to 100%, or from 90% to 100%.

In one embodiment, or a combination of embodiments described herein, the composition has a Fiber Tear (at −20° C.) from 70% to 100%, or from 75% to 100%, or from 80% to 100%, or from 85% to 100%, or from 90% to 100%, when bonded to a UV varnished substrate or a dense corrugated cardboard.

In one embodiment, or a combination of embodiments described herein, the composition has a Fiber Tear (at 23° C.) from 70% to 100%, or from 75% to 100%, or from 80% to 100%, when bonded to a UV varnished substrate or a dense corrugated cardboard.

In one embodiment, or a combination of embodiments described herein, the composition has a Fiber Tear (at 60° C.) from 70% to 100%, or from 75% to 100%, or from 80% to 100% or from 85% to 100%, or from 90% to 100%, when bonded to a UV varnished substrate or a dense corrugated cardboard.

In one embodiment, or a combination of embodiments described herein, the composition is in a pellet form (for example, a single pellet).

In one embodiment, or a combination of embodiments described herein, the composition has a gel content (GI200) of ≤20, or ≤18, or ≤16, or ≤14, or ≤12, or ≤10, or ≤8.0, or ≤7.0, or ≤6.0, or ≤5.0 mm$^2$ per 24.6 cm$^3$ of film.

In one embodiment, or a combination of embodiments describe herein, the composition comprises<0.10 wt %, or <0.05 wt %, or <0.01 wt % of EVA, based on the weight of the composition. In a further embodiment, the composition does not comprise EVA.

In one embodiment, or a combination of embodiments describe herein, the composition comprises<0.10 wt %, or <0.05 wt %, or <0.01 wt % of a propylene-based polymer, based on the weight of the composition. In a further embodiment, the composition does not comprise a propylene-based polymer.

In one embodiment, or a combination of embodiments describe herein, the composition comprises<0.10 wt %, or <0.05 wt %, or <0.01 wt % of a polymer containing, in polymerized form, styrene, based on the weight of the composition. In a further embodiment, the composition does not comprise a polymer containing, in polymerized form, styrene.

In one embodiment, or a combination of embodiments describe herein, the composition comprises<0.10 wt %, or <0.05 wt %, or <0.01 wt % of a fluoro-containing polymer, based on the weight of the composition. In a further embodiment, the composition does not comprise a fluoro-containing polymer.

In one embodiment, or a combination of embodiments describe herein, the composition comprises<0.10 wt %, or <0.05 wt %, or <0.01 wt % of a polyurethane, based on the weight of the composition. In a further embodiment, the composition does not comprise a polyurethane.

In one embodiment, or a combination of embodiments described herein, the composition further comprises one or more additives. Additives include, but are not limited to, anti-oxidants, fire retardants, UV stabilizers, plasticizers, colorants, fillers (e.g., inorganic fillers), and slip agents. In one embodiment, the composition comprises from greater than zero, or ≥0.1 wt %, or ≥0.2 wt %, or ≥0.5 wt % to ≤10.0 wt %, or ≤5.0 wt %, or ≤2.0 wt %, or ≤1.0 wt % of the combined weight of one or more additives, based on the weight of the final composition.

Also is provided an article that comprises at least one component formed from the composition of one or more embodiments described herein.

In one embodiment, or a combination of embodiments described herein, the article is selected from a package structure, an adhesive primer composition, a dispersion, an automotive part, or a building or construction part. In one embodiment, or a combination of embodiments described herein, the article is selected from a film structure comprising one or more layers.

Ethylene/Alpha-Olefin Interpolymer Used to Form the Acid and/or Anhydride Grafted Ethylene/Alpha-Olefin Interpolymer In one embodiment, or a combination of embodiments described herein, the ethylene/alpha-olefin interpolymer, and further copolymer, comprises greater than, or equal to, 60 wt %, further greater than, or equal to, 70 wt %, further greater than, or equal to, 80 wt %, further greater than, or equal to, 85 wt %, or equal to, 90 wt % polymerized ethylene, based on the weight of the interpolymer. In one embodiment, the ethylene/alpha-olefin interpolymer is an ethylene/alpha-olefin copolymer. Suitable α-olefins include, but are not limited to, $C_3$-$C_{20}$ α-olefins, and preferably $C_3$-$C_{10}$ α-olefins. More preferred α-olefins include propylene, 1-butene, 1-pentene, 1-hexene, 1-heptene and 1-octene, further include propylene, 1-butene, 1-hexene and 1-octene, and further 1-butene, 1-hexene and 1-octene.

In one embodiment, or a combination of embodiments described herein, the ethylene/alpha-olefin interpolymer, and further copolymer, has a density≥0.855 g/cc, or ≥0.860 g/cc, or ≥0.865 g/cc, or ≥0.870 g/cc (1 cc=1 cm$^3$). In one embodiment, or a combination of embodiments described herein, the ethylene/alpha-olefin interpolymer, and further copolymer, has a density≤0.920 g/cc, or ≤0.915 g/cc, or ≤0.910 g/cc, or ≤0.905 g/cc, or ≤0.900 g/cc. Suitable α-olefins are described above.

In one embodiment, or a combination of embodiments described herein, the ethylene/alpha-olefin interpolymer, and further copolymer, has a melt index ($I_2$, 2.16 kg, 190° C.)≥100 dg/min, ≥150 dg/min, or ≥200 dg/min, or ≥250 dg/min, or ≥300 dg/min, or ≥350 dg/min. In one embodiment, ethylene/alpha-olefin interpolymer, and further copolymer, the ethylene/alpha-olefin interpolymer, and further copolymer, has a melt index ($I_2$, 2.16 kg, 190° C.)≤2500 dg/min, or ≤2000 dg/min, or ≤1500 dg/min, or ≤1000 dg/min, or ≤500 dg/min. Suitable α-olefins are described above.

The ethylene-based interpolymer, or copolymer, may comprise a combination of two or more embodiments as described herein.

Summary of Some Embodiments a) A composition that comprises an acid and/or anhydride grafted ethylene/alpha-olefin interpolymer that comprises the following properties:
A) number of grafts per polymer chain≥1.80, and
B) melt viscosity (at 177° C.)≤50,000 mPa·s.

b) The composition of a) above, wherein the acid and/or anhydride grafted ethylene/alpha-olefin interpolymer is an acid and/or anhydride grafted ethylene/alpha-olefin copolymer. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

c) The composition of a) or b) above, wherein the acid and/or anhydride grafted ethylene/alpha-olefin interpolymer, and further copolymer, has a density≥0.855 g/cc, or ≥0.860 g/cc, or ≥0.865 g/cc, or ≥0.870 g/cc (1 cc=1 $cm^3$). Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

d) The composition of any one of a)-c) above, wherein the acid and/or anhydride grafted ethylene/alpha-olefin interpolymer, and further copolymer, has a density≤0.900 g/cc, or ≤0.895 g/cc, or ≤0.890 g/cc, or ≤0.885 g/cc (1 cc=1 $cm^3$). Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

e) The composition of any one of a)-d) above, wherein the acid and/or anhydride grafted ethylene/alpha-olefin interpolymer, and further copolymer, has a density from 0.855 to 0.900 g/cc, or from 0.860 to 0.890 g/cc, or from 0.865 to 0.885 g/cc. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

f) The composition of any one of a)-e) above, wherein the acid and/or anhydride grafted ethylene/alpha-olefin interpolymer, and further copolymer, has a melt viscosity (177° C.)≥5,000 mPa·s, or ≥6,000 mPa·s, or ≥7,000 mPa·s, or ≥8,000 mPa·s, ≥9,000 mPa·s, or ≥10,000 mPa·s, or ≥12,000 mPa·s. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

g) The composition of any one of a)-f) above, wherein the acid and/or anhydride grafted ethylene/alpha-olefin interpolymer, and further copolymer, has a melt viscosity (177° C.)≤45,000 mPa·s, or ≤40,000 mPa·s, or ≤35,000 mPa·s, or ≤30,000 mPa·s, or ≤25,000 mPa·s. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

h) The composition of any one of a)-g) above, wherein In one embodiment, or a combination of embodiments described herein, the acid and/or anhydride grafted ethylene/alpha-olefin interpolymer, and further copolymer, has a melt viscosity (177° C.)≤28,000 mPa·s, or ≤26,000 mPa·s, or ≤24,000 mPa·s, or ≤22,000 mPa·s. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

i) The composition of any one of a)-h) above, wherein the acid and/or anhydride grafted ethylene/alpha-olefin interpolymer, and further copolymer, has a melt viscosity (177° C.) from 5,000 to 30,000 mPa·s, or from 10,000 to 28,000 mPa·s, or from 12,000 to 26,000 mPa·s, or from 14,000 to 24,000 mPa·s, or from 16,000 to 22,000 mPa·s. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

j) The composition of any one of a)-i) above, wherein the acid and/or anhydride grafted ethylene/alpha-olefin interpolymer, and further copolymer, is an anhydride grafted ethylene/alpha-olefin interpolymer, and further copolymer. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

k) The composition of any one of a)-j) above, wherein the acid and/or anhydride grafted ethylene/alpha-olefin interpolymer, and further copolymer, is a maleic anhydride grafted ethylene/alpha-olefin interpolymer, and further copolymer. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

l) The composition of any one of a)-k) above, wherein the acid and/or anhydride grafted ethylene/alpha-olefin interpolymer, and further copolymer, is present in an amount ≥5 wt %, or ≥10 wt %, or ≥15 wt % based on the weight of the composition.

m) The composition of any one of a)-l) above, wherein the acid and/or anhydride grafted ethylene/alpha-olefin interpolymer, and further copolymer, is present in an amount ≤60 wt %, or ≤55 wt %, or ≤50 wt %, or ≤45 wt %, based on the weight of the composition. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

n) The composition of any one of a)-m) above, wherein the acid and/or anhydride grafted ethylene/alpha-olefin interpolymer, and further copolymer, has ≥1.85, or ≥1.90, or ≥1.95, or ≥2.00 grafts per polymer chain. Here the term "grafts" refer to the grafted acid and/or anhydride functionalization agent.

o) The composition of any one of a)-n) above, wherein the acid and/or anhydride grafted ethylene/alpha-olefin interpolymer, and further copolymer, has ≤5.00 or ≤4.50, or ≤4.00 or ≤3.50 grafts per polymer chain. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

p) The composition of any one of a)-o) above, wherein the acid and/or anhydride grafted ethylene/alpha-olefin interpolymer, and further copolymer, has ≥1.0, or ≥1.2, or ≥1.4 or ≥1.8 wt % grafted acid and/or anhydride groups, based on the total weight of the interpolymer, or copolymer.

q) The composition of any one of a)-p) above, wherein the acid and/or anhydride grafted ethylene/alpha-olefin interpolymer, and further copolymer, has ≤6.0 or ≤5.5, or ≤5.0 or ≤4.5 grafted acid and/or anhydride, based on the total weight of the interpolymer, or copolymer. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

r) The composition of any one of a)-q) above, wherein the acid and/or anhydride grafted ethylene/alpha-olefin interpolymer, and further copolymer, has a number average molecular weight (Mn)≥5,000 g/mole, or ≥6,000 g/mole, or ≥7,000 g/mole, or ≥8,000 g/mole, ≥9,000 g/mole, or ≥10,000 g/mole. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

s) The composition of any one of a)-r) above, wherein the acid and/or anhydride grafted ethylene/alpha-olefin interpolymer, and further copolymer, has a number average molecular weight (Mn)≤50,000 g/mole, or ≤45,000 g/mole, or ≤40,000 g/mole, or ≤35,000 g/mole, or ≤30,000 g/mole, or ≤25,000 g/mole, or ≤20,000 g/mole, or ≤15,000 g/mole. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

t) The composition of any one of a)-s) above, wherein the acid and/or anhydride grafted ethylene/alpha-olefin interpolymer, and further copolymer, has a molecular weight distribution (Mw/Mn)≥1.80, or ≥1.90, or ≥2.00, or ≥2.10. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

u) The composition of any one of a)-t) above, wherein the acid and/or anhydride grafted ethylene/alpha-olefin interpolymer, and further copolymer, has a molecular weight distribution (Mw/Mn)≤3.00, or ≤2.80, or ≤2.60, or 2.40. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

v) The composition of any one of a)-u) above, wherein the acid and/or anhydride grafted ethylene/alpha-olefin interpolymer, and further copolymer, is present in an amount ≥95 wt %, or ≥98 wt %, or ≥99 wt % based on the weight of the composition. Suitable α-olefins include $C_3$-$C_{20}$ α-olefins, further $C_3$-$C_{10}$ α-olefins, and further propylene, 1-butene, 1-hexene and 1-octene, or 1-butene, 1-hexene and 1-octene.

w) The composition of any one of a)-v) above, wherein the composition further comprises a tackifier. The tackifier includes, but not limited to, aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures of two or more of these tackifiers.

x) The composition of any one of a)-w) above, wherein the composition further comprises a wax. The wax includes, but not limited to, paraffin wax, microcrystalline wax, high density, low molecular weight polyethylene wax, polypropylene wax, thermally degraded wax, by-product polyethylene wax, Fischer-Tropsch wax, oxidized Fischer-Tropsch wax, and functionalized wax, such as hydroxyl stearamide wax and fatty amide wax or a mixture thereof.

y) The composition of any one of a)-x) above, wherein the composition further comprises a non-functionalized ethylene/alpha-olefin interpolymer, and further a non-functionalized ethylene/alpha-olefin copolymer.

z) The composition of any one of a)-y) above, wherein the composition further comprises a second acid and/or anhydride grafted ethylene/alpha-olefin interpolymer, and further copolymer, and wherein the two interpolymers (or copolymers) differ in one or more properties, such as melt viscosity (177 C), density, Mn, or Mw/Mn.

aa) The composition of any one of a)-z) above, wherein the composition has a melt viscosity (177° C.)≥500 mPa·s, or ≥600 mPa·s, or ≥700 mPa·s, or ≥800 mPa·s, ≥900 mPa·s, or ≥1,000 mPa·s.

bb) The composition of any one of a)-aa) above, wherein the composition has a melt viscosity (177° C.)≤5,000 mPa·s, or ≤4,500 mPa·s, or ≤4,000 mPa·s, or ≤3,500 mPa·s, or ≤3,000 mPa·s, or ≤2,500 mPa·s, or ≤2,000 mPa·s, or ≤1,500 mPa·s.

cc) The composition of any one of a)-bb) above, wherein the composition has a Heat Stress≥40° C., or ≥45° C., or ≥50° C., or ≥55° C., ≥60° C.

dd) The composition of any one of a)-cc) above, wherein the composition has a Heat Stress≤95° C., or ≤90° C., or ≤85° C., or ≤80° C., or ≤75° C.

ee) The composition of any one of a)-dd) above, wherein the composition has a Fiber Tear (at –20° C.) from 70% to 100%, or from 75% to 100%, or from 80% to 100%, or from 85% to 100%, or from 90% to 100%.

ff) The composition of any one of a)-ee) above, wherein the composition has a Fiber Tear (at 23° C.) from 70% to 100%, or from 75% to 100%, or from 80% to 100%.

gg) The composition of any one of a)-ff) above, wherein the composition has a Fiber Tear (at 60° C.) from 70% to 100%, or from 75% to 100%, or from 80% to 100% or from 85% to 100%, or from 90% to 100%.

hh) The composition of any one of a)-gg) above, wherein the composition has a Fiber Tear (at –20° C.) from 70% to 100%, or from 75% to 100%, or from 80% to 100%, or from 85% to 100%, or from 90% to 100%, when bonded to a UV varnished substrate or a dense corrugated cardboard.

ii) The composition of any one of a)-hh) above, wherein the composition has a Fiber Tear (at 23° C.) from 70% to 100%, or from 75% to 100%, or from 80% to 100%, when bonded to a UV varnished substrate or a dense corrugated cardboard.

jj) The composition of any one of a)-ii) above, wherein the composition has a Fiber Tear (at 60° C.) from 70% to 100%, or from 75% to 100%, or from 80% to 100% or from 85% to 100%, or from 90% to 100%, when bonded to a UV varnished substrate or a dense corrugated cardboard.

kk) The composition of any one of a)-jj) above, wherein the composition is in a pellet form (for example, a single pellet).

ll) The composition of any one of a)-kk) above, wherein the composition has a gel content (GI200) of ≤20, or ≤18, or ≤16, or ≤14, or ≤12, or ≤10, or ≤8.0, or ≤7.0, or ≤6.0, or ≤5.0 mm$^2$ per 24.6 cm$^3$ of film.

mm) The composition of any one of a)-ll) above, wherein the composition comprises<0.10 wt %, or <0.05 wt %, or <0.01 wt % of EVA, based on the weight of the composition. In a further embodiment, the composition does not comprise EVA.

nn) The composition of any one of a)-mm) above, wherein the composition comprises<0.10 wt %, or <0.05 wt %, or <0.01 wt % of a propylene-based polymer, based on the weight of the composition. In a further embodiment, the composition does not comprise a propylene-based polymer.

oo) The composition of any one of a)-nn) above, wherein the composition comprises<0.10 wt %, or <0.05 wt %, or <0.01 wt % of a polymer containing, in polymerized form, styrene, based on the weight of the composition. In a further embodiment, the composition does not comprise a polymer containing, in polymerized form, styrene.

pp) The composition of any one of a)-oo) above, wherein the composition comprises<0.10 wt %, or <0.05 wt %, or <0.01 wt % of a fluoro-containing polymer, based on the weight of the composition. In a further embodiment, the composition does not comprise a fluoro-containing polymer.

qq) The composition of any one of a)-pp) above, wherein the composition comprises<0.10 wt %, or <0.05 wt %, or <0.01 wt % of a polyurethane, based on the weight of the composition. In a further embodiment, the composition does not comprise a polyurethane.

rr) The composition of any one of a)-qq) above, wherein the composition further comprises one or more additives. Additives include, but are not limited to, anti-oxidants, fire retardants, UV stabilizers, plasticizers, colorants, fillers (e.g., inorganic fillers), and slip agents.

ss) The composition of any one of a)-rr) above, wherein the composition comprises from greater than zero, or ≥0.1 wt %, or ≥0.2 wt %, or ≥0.5 wt % to ≤10.0 wt %, or ≤5.0 wt %, or ≤2.0 wt %, or ≤1.0 wt % of the combined weight of one or more additives, based on the weight of the final composition.

tt) An article that comprises at least one component formed from the composition of any one of a)-ss) above.

uu) The article of tt) above, wherein the article is selected from a package structure, an adhesive primer composition, a dispersion, an automotive part, or a building or construction part. In one embodiment, or a combination of embodiments described herein, the article is selected from a film structure comprising one or more layers.

Definitions

Unless stated to the contrary, all test methods are current as of the filing date of this disclosure.

The term "composition," as used herein, includes a material or mixture of materials which comprise the composition, as well as reaction products and decomposition products formed from the materials of the composition. Typically, any reaction products and/or decomposition products are present in trace amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "olefin-based polymer," as used herein, refers to a polymer that comprises, in polymerized form, 50 wt % or a majority amount of an olefin monomer, for example, ethylene or propylene, based on the weight of the polymer, and optionally may comprise one or more comonomers. In one embodiment, the olefin-based polymer comprises a majority amount of the olefin monomer (based on the weight of the polymer) and optionally may comprise one or more comonomers.

The term "propylene-based polymer," as used herein, refers to a polymer that comprises, in polymerized form, a majority amount of propylene monomer based on the weight of the polymer and, optionally may comprise one or more comonomers.

The term, "ethylene-based polymer," as used herein, refers to a polymer that comprises, in polymerized form, at least 50 wt % or a majority amount of ethylene monomer (based on the weight of the polymer), and optionally may comprise one or more comonomers. In one embodiment, the ethylene-based polymer comprises a majority amount of ethylene monomer (based on the weight of the ethylene-based polymer), and optionally may comprise one or more comonomers.

The term, "ethylene/α-olefin interpolymer," as used herein, refers to an interpolymer that comprises, in polymerized form, at least 50 wt % or a majority amount of ethylene monomer (based on the weight of the interpolymer), and at least one α-olefin. In one embodiment, the ethylene/α-olefin interpolymer comprises a majority amount of ethylene monomer (based on the weight of the ethylene-based copolymer) and at least one α-olefin.

The term, "ethylene/α-olefin copolymer," as used herein, refers to a copolymer that comprises, in polymerized form, at least 50 wt % or a majority amount of ethylene monomer (based on the weight of the copolymer), and an α-olefin, as the only two monomer types. In one embodiment, the ethylene/α-olefin copolymer comprises a majority amount of ethylene monomer (based on the weight of the ethylene-based copolymer) and an α-olefin as the only monomer types.

The term "acid and/or anhydride grafted ethylene/alpha-olefin interpolymer," and similar terms, as used herein, refer to an ethylene/alpha-olefin interpolymer comprising, in graft form, bonded carboxylic acid groups and/or bonded anhydride groups.

The term "anhydride grafted ethylene/alpha-olefin interpolymer," and similar terms, as used herein, refer to an ethylene/alpha-olefin interpolymer comprising, in graft form, bonded anhydride groups. As understood in the art, trace amounts of anhydride groups may form carboxylic acid groups due to reaction with water, for example, in an atmosphere.

The term "functionalization agent," as used herein, refers to a compound containing at least one functional group which may be bonded into (for example, incorporated) and/or onto (for example, grafted) a polymer (i.e., an ethylene-based polymer).

The term "functional group," as used herein, refers to a chemical group comprising at least one heteroatom (e.g., O, N, Si, Cl). A functional group may additionally contain unsaturation. Exemplary functional groups include, but are not limited to, acid and anhydrides.

The term "free-radical initiator," as used herein, refers to a compound that produces radical species for radical reactions.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density

Density was measured in accordance with ASTM D792, Method B. The result was recorded in grams (g) per cubic centimeter (g/cc or g/cm$^3$).

Maleic Anhydride Content (MAH)—Fourier Transform Infrared Spectroscopy (FTIR) Analysis The concentration of maleic anhydride is determined by the ratio of peak heights of the maleic anhydride at wave number 1791 cm$^{-1}$ to the polymer reference peak, which, in case of polyethylene, is at wave number 2019 cm$^{-1}$. Maleic anhydride content is calculated by multiplying this ratio with the appropriate calibration constant. The equation used for maleic grafted olefin-based polymer (with reference peak for polyethylene) has the following form, as shown in Equation 1.

$$\text{MAH(wt \%)} = A*\{[\text{FTIR PeakArea@1791 cm-1}]/[\text{FTIR PeakArea2019 cm-1}] + B*[\text{FTIR PeakArea@1712 cm-1}]/[\text{FTIR\_PeakArea@2019 cm-1}]\} \quad \text{(Eqn. 1)}$$

The calibration constant A can be determined using C13 NMR standards. The actual calibration constant may differ slightly, depending on the instrument and polymer. The second component at wave number 1712 cm$^{-1}$ accounts for the presence of maleic acid, which is negligible for freshly grafted material. Over time, however, maleic anhydride is readily converted to maleic acid in the presence of moisture. Depending on surface area, significant hydrolysis can occur in just a few days under ambient conditions. The acid has a distinct peak at wave number 1712 cm$^{-1}$. The constant B in Equation 1 is a correction for the difference in extinction coefficients between the anhydride and acid groups.

The sample preparation procedure begins by making a pressing, typically 0.05 to 0.15 millimeters in thickness, in a heated press, between two protective films, at 150-180° C. for one hour. MYLAR and TEFLON are suitable protective films to protect the sample from the platens. Aluminum foil must never be used (maleic anhydride reacts with aluminum). Platens should be under pressure (~10 ton) for about five minutes. The sample is allowed to cool to room temperature, placed in an appropriate sample holder, and then scanned in the FTIR. A background scan should be run before each sample scan, or as needed. The precision of the test is good, with an inherent variability of less than ±5%. Samples should be stored with desiccant to prevent excessive hydrolysis. Moisture content in the product has been measured as high as 0.1 weight percent. The conversion of anhydride to acid is reversible with temperature, but may take up to one week for complete conversion. The reversion is best performed in a vacuum oven at 150° C.; a good vacuum (>27 inches Hg) is required. If the vacuum is less than adequate, the sample tends to oxidize resulting in an infrared peak at approximately 1740 cm$^{-1}$, which will cause the values for the graft level to be too low. Maleic anhydride and acid are represented by peaks at about 1791 and 1712 cm$^{-1}$, respectively.

Gel Permeation Chromatography (GPC)

The chromatographic system consists of a PolymerChar GPC-IR (Valencia, Spain) high temperature GPC chromatograph, equipped with an internal IR5 infra-red detector (IR5). The autosampler oven compartment is set at 160° C., and the column compartment is set at 150° C. The columns used are 4 Agilent "Mixed A" 30 cm 20-micron linear mixed-bed columns, and a 20-um pre-column. The chromatographic solvent is 1,2,4-trichlorobenzene, which contains 200 ppm of butylated hydroxytoluene (BHT). The solvent source is nitrogen sparged. The injection volume used is 200 microliters and the flow rate is 1.0 milliliters/minute.

Calibration of the GPC column set is performed with 21 narrow molecular weight distribution polystyrene standards, with molecular weights ranging from 580 to 8,400,000 g/mol, and which are arranged in six "cocktail" mixtures, with at least a decade of separation between individual molecular weights. The standards are purchased from Agilent Technologies. The polystyrene standards are prepared at "0.025 grams in 50 milliliters of solvent" for molecular weights equal to, or greater than, 1,000,000 g/mol, and at "0.05 grams in 50 milliliters of solvent" for molecular weights less than 1,000,000 g/mol. The polystyrene standards are dissolved at 80° C., with gentle agitation, for 30 minutes. The polystyrene standard peak molecular weights are converted to ethylene-based polymer molecular weights, using Equation 2 (as described in Williams and Ward, J. Polym. Sci., Polym. Let., 6, 621 (1968)): $M_{polyethylene} = A \times (M_{polystyrene})^B$ (Equation 2), where M is the molecular weight, A has a value of 0.4315 and B is equal to 1.0.

A fifth order polynomial is used to fit the respective ethylene-based polymer-equivalent calibration points. A small adjustment to A (from approximately 0.415 to 0.44) is made to correct for column resolution and band-broadening effects, such that NIST standard NBS 1475 is obtained at a molecular weight of 52,000 g/mol.

The total plate count of the GPC column set is performed with EICOSANE (prepared at "0.04 g in 50 milliliters of TCB," and dissolved for 20 minutes with gentle agitation). The plate count (Equation 3) and symmetry (Equation 4) are measured on a 200 microliter injection according to the following equations:

$$\text{Plate Count} = 5.54 \times \left( \frac{RV_{Peak\ Max}}{\text{Peak Width at half height}} \right)^2, \quad \text{(Equation 3)}$$

where RV is the retention volume in milliliters, the peak width is in milliliters, the peak max is the maximum height of the peak, and half height is one half of the height of the peak maximum;

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height}}, \quad \text{(Equation 4)}$$

where RV is the retention volume in milliliters, and the peak width is in milliliters, peak max is the maximum height of the peak, one tenth height is one tenth of the height of the peak maximum, and where rear peak refers to the peak tail at later retention volumes than the peak max, and where front peak refers to the peak front at earlier retention volumes than the peak max. The plate count for the chromatographic system should be greater than 22,000, and symmetry should be between 0.98 and 1.22.

Samples are prepared in a semi-automatic manner with the PolymerChar "Instrument Control" Software, wherein the samples are weight-targeted at 2 mg/ml, and the solvent (contained 200 ppm BHT) is added to a pre nitrogen-sparged septa-capped vial, via the PolymerChar high temperature autosampler. The samples are dissolved for three hours at 160° C., under "low speed" shaking.

The calculations of $M_{n(GPC)}$, $M_{w(GPC)}$, and $M_{z(GPC)}$ are based on the GPC results, using the internal IR5 detector (measurement channel) of the PolymerChar GPC-IR chromatograph according to Equations 5-8, using PolymerChar GPCOne™ software, the baseline-subtracted IR chromatogram at each equally-spaced data collection point i ($IR_i$), and the ethylene-based polymer equivalent molecular weight obtained from the narrow standard calibration curve for the point i ($M_{polyethylene,i}$ in g/mol) from Equation 6. Subsequently, a GPC molecular weight distribution (GPC-MWD) plot ($wt_{GPC}$(1 gMW) vs. 1 gMW plot, where $wt_{GPC}$(1 gMW) is the weight fraction of ethylene-based polymer molecules with a molecular weight of 1 gMW) for the ethylene-based polymer sample can be obtained. Molecular weight is in g/mol and $wt_{GPC}$(1 gMW) follows: $\int wt_{GPC}(1\ g\ MW) d\ 1\ g\ MW = 1.00$ (Equation 5).

Number-average molecular weight $M_{n(GPC)}$, weight-average molecular weight $M_{w(GPC)}$ and z-average molecular weight $M_{z(GPC)}$ can be calculated as the following equations:

$$Mn_{(GPC)} = \frac{\sum\limits_i IR_i}{\sum\limits_i (IR_i / M_{polyethylene,i})}; \quad \text{(Equation 6)}$$

$$M_{W(GPC)} = \frac{\sum_i (IR_i * M_{polyethylene,i})}{\sum_i IR_i}; \quad \text{(Equation 7)}$$

$$M_{Z(GPC)} = \frac{\sum_i (IR_i * M_{polyethylene,i}^2)}{\sum_i (IR_i * M_{polyethylene,i})}. \quad \text{(Equation 8)}$$

In order to monitor the deviations over time, a flow rate marker (decane) is introduced into each sample via a micropump controlled with the PolymerChar GPC-IR system. This flow rate marker (FM) is used to linearly correct the pump flow rate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flow rate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (with respect to the narrow standards calibration) is calculated as Equation 9. Processing of the flow marker peak is done via the PolymerChar GPCOne™ Software. Acceptable flow rate correction is such that the effective flowrate should be within 0.5% of the nominal flowrate. Flow rate$_{effective}$=Flow rate$_{nominal}$×(RV(FM$_{calibrated}$)/RV(FM$_{Sample}$)) (Equation 9).

Grafts Per Chain Calculation Method

The grafts per chain are calculated using the following Formula A:

$$\text{Grafts per Chain} = \frac{\frac{MAH \text{ wt \%}}{98}}{\frac{100 - MAH \text{ wt \%}}{M_n}}, \quad \text{(Formula A)}$$

where 98 is the MAH molecular weight. The number average molecular weight ($M_n$) of the grafted polymer was measured using the GPC test method (outlined above).

Fiber Tear

Fiber Tear (%) Percent fiber tear (FT) of compositions using UV varnished substrates or dense corrugated cardboard was determined according to a standardized method. A bead of sample composition (0.00014 lb/in) was applied on to a cardboard coupon (5×6 cm) using an Olinger Bond Tester, and a second coupon was quickly placed on top of the sample composition. Light finger pressure, for about 3 seconds, was applied to hold the bond in place. Samples were conditioned for at least 4 hours at room temperature and 50% relative humidity. Next, samples were conditioned at the test temperatures for 5 hours to 24 hours. Samples (n=5) were pulled apart by hand and the failure mode (fiber tear, cohesive failure, adhesive failure), and the average result was recorded.

Heat Stress

Heat stress resistance (Heat Stress) was measured according to the "Suggested Test Method for Determining the Heat Stress Resistance of Hot Melt Adhesives," method T-3006, prepared by the Institute of Packaging Professions (IoPP). To prepare one sample, two cardboard coupons available from Inland Corrugated Cardboard (cut with flutes running in the long direction) having dimensions of 2 inches (50.8 mm)×3 3/16 in (81 mm) and 2 in (50.8 mm)×5 1/2 in (139.7 mm) were bonded by applying 0.000141b/in of the composition using an Olinger Bond Tester (application temperature 177° C.), and this tester was used to compress the coupons at a constant pressure, and without a further application of heat. The composition was applied perpendicular to the flutes in the center of the shorter coupon and the coupons were bonded such that the composition was 3/4 in (19 mm) from one end of the long coupon. Five replicates were made for each composition. Each coupon was stored for 24 hours, at 22° C.-23° C., and 50% relative humidity. Samples (10) were then loaded into a sample holder (12), with the short coupon end aligned with the edge of the sample holder (12), as shown in the FIGURE. The samples (10) were held in place with a wide plate (14) of the sample holder (10), and the plate (14) was secured by wingnuts (16) to the sample holder (12). A "200 g" weight (18) was attached to the coupon (20), at a distance of 3.94 in (100 mm) from the bond. The weight (18) was secured by placing the peg attached to the weight into a hole made in the end of the longer coupon. The sample holder (12), containing the coupon (20) and the attached weight (18), was then placed into a convection oven (not shown), equilibrated at a set temperature, and remained in the oven for 24 hours. At the end of the 24 hours, if at least 80% of the bonds (i.e., 4 bonds) do not fail, then the sample is considered to have passed heat resistance testing at the test temperature. The oven temperature was varied, until the maximum passing heat stress resistance (temperature) was determined. All new bonded coupon samples were used for each test temperature. Results are reported as heat stress temperature (° C.).

Melt Viscosity

Melt viscosity (at 177° C., or noted temperature) was measured using a Brookfield Viscometer Model, and a Brookfield RV-DV-II-Pro viscometer spindle 31. The sample was poured into an aluminum disposable tube-shaped chamber, which was, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams) was heated to the required temperature, until the melted sample was one inch below the top of the sample chamber. The viscometer apparatus was lowered, and the spindle submerged into the middle of the sample chamber, wherein the spindle did not touch the sides of the chamber. Lowering was continued, until the brackets on the viscometer align on the Thermosel. The viscometer was turned on, and set to operate at a steady shear rate, which led to a torque reading in the range from 40 to 60 percent of the total torque capacity, based on the rpm output of the viscometer. Readings were taken every minute for 15 minutes, or until the values stabilize, at which point, a final reading was recorded.

Differential Scanning Calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at 190° C.; the melted sample was then air-cooled to room temperature (25° C.). A "3-10 mg," 6 mm diameter specimen was extracted from the cooled polymer, weighed, placed in a light aluminum pan (50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C. and held isothermal for 3 minutes, in order to remove its thermal history. Next, the sample was cooled to −80° C., at a 10° C./minute cooling rate, and held isothermal at −80° C. for 3 minutes. The sample was then heated to 180° C. (this is the "second heat" ramp) at a 10° C./minute heating rate. The cooling and second heating curves were recorded. The values determined are extrapolated onset of melting, $T_m$, and extrapolated onset of crystallization, $T_c$.

The heat of fusion ($H_f$) and the peak melting temperature were reported from the second heat curve. Peak crystallization temperature was determined from the cooling curve.

Melting point, $T_m$, was determined from the DSC heating curve by first drawing the baseline between the start and end of the melting transition. A tangent line was then drawn to the data on the low temperature side of the melting peak. Where this line intersects the baseline is the extrapolated onset of melting ($T_m$). This is as described in Bernhard Wunderlich, *The Basis of Thermal Analysis, in Thermal Characterization of Polymeric Materials* 92, 277-278 (Edith A. Turi ed., 2d ed. 1997).

Crystallization temperature, $T_c$, was determined from a DSC cooling curve as above, except the tangent line was drawn on the high temperature side of the crystallization peak. Where this tangent intersects the baseline is the extrapolated onset of crystallization ($T_c$).

Glass transition temperature, $T_g$, was determined from the DSC heating curve, where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines were drawn from below and above the glass transition region and extrapolated through the $T_g$ region. The temperature at which the sample heat capacity was half-way between these baselines is the $T_g$.

Peel Adhesion Failure Temperature (PAFT) and Shear Adhesion Failure Temperature (SAFT)

Peel adhesion failure temperature (PAFT) was tested according to ASTM D 4498, with a "100 gram weight" in the peel mode. The tests were started at room temperature (25° C./77° F.), and the temperature was increased at an average rate of 0.5° C./minute.

Shear Adhesion Failure Temperature (SAFT) was measured according to ASTM D 4498, with a "500 gram weight" in the shear mode. The tests were started at room temperature (25° C./77° F.), and the oven temperature was ramped at an average rate of 0.5° C./minute. The temperature at which the specimen failed was recorded.

Samples for PAFT and SAFT testing were prepared using two sheets of 40 pound Kraft paper, each of 6×12 in (152×305 mm) dimensions. On the bottom sheet, lengthwise, and separated by a gap of 1 in (25 mm), were adhered, in parallel fashion, two "1.75 in or 2.00 in (45 mm or 51 mm) wide" strips of a one sided, pressure-sensitive tape such as masking tape. The composition sample to be tested was heated to 177° C. (350° F.), and drizzled in an even manner down the center of the gap formed between the tape strips. Then, before the composition could unduly thicken, two glass rods, one rod riding immediately upon the tapes, and shimmed on each side of the gap with a strip of the same tape, followed by the second rod, and (between the two rods) the second sheet of paper, were slid down the length of the sheets. This was done in a fashion, such that the first rod evenly spread the composition in the gap between the tape strips, and the second rod evenly compress the second sheet over the top of the gap, and on top of the tape strips. Thus, a single "1 inch (25.4 mm) wide" strip of sample sheet was created between the two tape strips, and bonding the paper sheets. The sheets so bonded were cut crosswise into strips of "width 1 inch (25.4 mm)" and "length of 3 inches (76.2 mm)," each strip having a "1 in×1 in (25 mm×25 mm)" adhesive sample bond in the center. The strips were then used in the PAFT and SAFT testing, as desired.

Experimental

1. Preparation of MAH Functionalized Ethylene/Octene Copolymer 1

The reaction mixture consisted of the base polymer, maleic anhydride (MAH), and peroxide (POX) that was diluted with mineral oil (1:1), to facilitate ease of handling and feeding. The POX was 2,5-dimethyl-2,5-di(tert-butylperoxy)hexane (DBPH, CAS No. 78-63-7); which can be obtained from Arkema or Akzo Nobel Corp. The MAH was obtained from MagnaKron Corporation. A "350 SUS white mineral oil" was used to dilute the POX. See Table 1. The grafting reaction was performed (extruder), and the grafted polymer was pelletized.

TABLE 1

Reagents used to make EO 1

| SAMPLE | BASE RESIN* | MAH, wt % | POX:oil (1:1), wt % | Active POX, ppm |
|---|---|---|---|---|
| EO 1 (MAH functionalized ethylene/octene copolymer 1) | AFFINITY GA 1875* | 2.2 | 0.28 | 1400 |

*Base resin commercially available from The Dow Chemical Company.

Equipment and Experimental Conditions

The grafting reaction was performed in two, 92 mm, co-rotating twin screw extruders, arranged in tandem. Each extruder was configured with 11 barrels (44 L/D), providing a total L/D ratio of 88. For each extruder, the maximum screw speed for was 625 rpm, and the motor output was 700 HP. The extrusion set-up was equipped with "loss-in-weight feeders," and the POX and molten MAH were metered into the extruder at Barrel 4B and Barrel 3B of the first extruder respectively. The run rate was between 1200-2000 lbs/hr. Nitrogen gas was injected, at approximately five standard cubic foot per hour (SCFH), in the first barrel of Extruder 1, to maintain an inert atmosphere and to minimize oxidation. A vacuum (20' Hg) was pulled on Barrel 10 of Extruder 2. The operating conditions for Extruder 1 & Extruder 2 are shown in Table 2. The "compounding set-up," downstream of Extruder 2, included a gear pump, a screen changer, a water slide, a strand pelletizer.

TABLE 2

Extruder Conditions

| Extruder 1 | Extruder 2 |
|---|---|
| Screw speed = 610 rpm | Screw speed = 280 or 475 rpm |
| Feed barrel - cooling | Barrel 1-4: 300° F. (149° C.) |

TABLE 2-continued

Extruder Conditions

| Extruder 1 | Extruder 2 |
|---|---|
| 120° F., (49° C.) | Barrel # 5-11: Target 100° F. |
| Barrel # 2: 140° F. (60° C.) | (38° C.) after startup |
| Barrel # 3: 248° F. (120° C.) | Transfer lines and Gear pump: |
| Barrel # 4-11: 550° F. | 302° F. (150° C.) |
| (288° C.) | Die: 400° F. (204° C.) |

Pelletization

A wet cut water slide, strand pelletizer consisted of a 40 hole die, with nominal 0.125" die hole diameter opening. The water slide had eight spray zones (three spray nozzles per zone), and the resulting pellet/water slurry was separated using a spin dryer. The water temperature was maintained from 50-65° F., and it was pumped at approximately 60 gpm to water slide. The cutter speed was about 1200±150 rpm.

2. Production of Compositions

Materials used to produce compositions, further hot melt adhesive compositions, are shown in Table 3 below. The starting materials from Table 3 are weighed, and then melt blended at 177° C., for 30 minute, at 100 rpm, using a small can mixer, equipped with temperature control. The compositions and their application performance data are provided in Tables 3-5 below.

The grafts per chain were calculated using Formula A. For example for EO 1 (MAH functionalized ethylene/octene copolymer 1), substituting the MAH graft level 1.92 wt % and the Mn 10367 g/mol in Formula A (see above), the chains per graft=(1.92/98)/(98.08/10367)=2.07.

TABLE 3

Materials for Compositions

| Component | Specification | Source |
|---|---|---|
| AFFINITY GA 1950 | ethylene/octene copolymer<br>Density = 0.874 g/mL<br>Melt viscosity at 177° C. (Brookfield) = 17000 mPa · s | The Dow Chemical Co. |
| AFFINITY GA 1900 | ethylene/octene copolymer<br>Density = 0.870 g/mL<br>Melt viscosity at 177° C. (Brookfield) = 8200 mPa · s | The Dow Chemical Co. |
| AFFINITY GA 1875 | ethylene/octene copolymer<br>Density = 0.870 g/mL<br>Melt viscosity at 177° C. (Brookfield) = 6700 mPa · s | The Dow Chemical Co. |
| AFFINITY GA 1000R | maleic anhydride grafted ethylene/octene copolymer<br>Melt viscosity at 177° C. (Brookfield) = 13000 mPa · s<br>MAH Graft Level: 1.1 wt %, based on weight of the grafted polymer; Grafts per chain = 0.95<br>Mn = 7,876 g/mol, MWD = 2.36 | The Dow Chemical Co. |
| EO 1 (MAH functionalized ethylene/octene copolymer 1) | maleic anhydride grafted ethylene/octene copolymer<br>Melt viscosity at 177° C. (Brookfield) = 20220 mPa · s<br>MAH Graft Level: 1.92 wt %, based on weight of the grafted polymer, Grafts per chain = 2.07<br>Mn = 10,367 g/mol, MWD = 2.35 | The Dow Chemical Co. |
| HONEYWELL A-C 573A | maleic anhydride grafted ethylene based polymer<br>density = 0.92 g/mL<br>acid number mg = 5 mg KOH/g<br>melt viscosity at 140° C. (Brookfield) = 600 mPa · s<br>MAH Graft Level: 0.24 wt %, based on weight of the grafted polymer; Grafts per chain = 0.08<br>Mn = 3,189 g/mol | Honeywell |
| HONEYWELL A-C 575A | maleic anhydride grafted ethylene based polymer<br>density = 0.92 g/mL<br>acid number = 33 mg KOH/g<br>melt viscosity at 140° C. (Brookfield) = 4200 mPa · s<br>MAH Graft Level: 3.11 wt %, based on the weight of the grafted polymer; Grafts per chain = 1.43<br>Mn = 4,351 g/mol | Honeywell |
| EASTOTAC H100W (H100W) | Tackifier—hydrogenated hydrocarbon resin<br>density = 1.04 g/mL<br>acid number = < 0.1 mg KOH/g<br>ring and ball softening point = 100° C.<br>form = Flake<br>melt viscosity at 190° C. (Brookfield) = 200 mPa · s<br>color, Gardner (ASTM D1544) = <1 | Eastman |
| SASOLWAX H1 | Fischer Tropsch wax, ethylene based polymer wax<br>density = 0.944 g/mL<br>acid number = < 0.1 mg KOH/g<br>congealing point = 96-100° C.<br>drop melting point = 112° C.<br>melt viscosity at 135° C. (Brookfield) = 6-10 mPa · s | Sasol |

TABLE 3-continued

Materials for Compositions

| Component | Specification | Source |
|---|---|---|
| IRGANOX 1010 (AO) | Antioxidant pentaerythritol tetrakis(3-(3,5-di-tert-butyl-4-hydroxyphenyl)propionate) (CAS 6683-19-8) density = 1.15 g/cc | BASF |

TABLE 4

Compositions and Application Performance Data for UV Varnished Substrates*

|  |  | Ex. 1 | Ex. 2 | CS. 1 | CS. 2 | CS. 3 | CS. 4 | CS. 5 | CS. 6 | CS. 7 | CS. 8 |
|---|---|---|---|---|---|---|---|---|---|---|---|
| AFFINITY GA 1950 | | 24 | — | — | 40 | 24 | — | 24 | — | 24 | — |
| EO 1 (MAH functionalized ethylene/octene copolymer 1) | | 16 | 40 | — | — | — | — | — | — | — | — |
| AFFINITY GA 1000R | | — | — | — | — | 16 | 40 | — | — | — | — |
| HONEYWELL A-C 573A | | — | — | — | — | — | — | 16 | 40 | — | — |
| HONEYWELL A-C 575A | | — | — | — | — | — | — | — | — | 16 | 40 |
| EASTOTAC H100W (tackifier) | | 39.5 | 39.5 | — | 39.5 | 39.5 | 39.5 | 39.5 | 39.5 | 39.5 | 39.5 |
| SASOLWAX H1 | | 20 | 20 | — | 20 | 20 | 20 | 20 | 20 | 20 | 20 |
| IRGANOX 1010 (Anti-Oxidant) | | 0.5 | 0.5 | — | 0.5 | 0.5 | 0.5 | 0.5 | 0.5 | 0.5 | 0.5 |
| Commercial EVA based formulation | | — | — | 100 | — | — | — | — | — | — | — |
| Total | | 100 wt % | 100 wt % | 100 wt % | 100 wt % | 100 wt % | 100 wt % | 100 wt % | 100 wt % | 100 wt % | 100 wt % |
| Melt Viscosity† @ 177° C. mPa·s | | 1222 | 1156 | 845 | 1170 | 986 | 792 | 483 | 65 | 594 | 89 |
| Heat Stress (° C.) | | 64.0 | 66.0 | 60.0 | 54.0 | 60.0 | 62.0 | 44.0 | <40 | 48.0 | 46.0 |
| PAFT (° C.) | | 60.8 | 58.5 | 62.4 | 55.9 | 61.8 | 59.5 | 62.4 | 85.7 | 60.3 | 81.1 |
| SAFT (° C.) | | 88.2 | 85.3 | 94.6 | 94.1 | 88.8 | 85 | 94.7 | 96.7 | 89.6 | 95.7 |
| Fiber Tear (%)‡ | −20° C. | 100 | 92 | NM# | NM | NM | NM | NM | NM | NM | NM |
|  | 23° C. | 100 | 82 | 0 | 0 | 15 | 41 | 0 | 0 | 0 | 0 |
|  | 60° C. | 91 | 100 | NM | NM | NM | NM | NM | NM | NM | NM |

CS = Comparative Sample
*Table values are weight percent (wt %), based on the total weight of the composition
†Melt Viscosity of the composition
‡Fiber tear percentage on UV-varnished substrate
Not Measured (As fiber tear at 23° C. for CS1, CS2, CS3 and CS4 are lower than 50%, fiber tear at −20° C. and 60° C. are not measured)

Hot melt adhesive composition, and application performance data, for UV varnished substrate are listed in Table 4. As shown in Table 4, the compositions containing the MAH functionalized ethylene/octene copolymer (Ex. 1 and Ex. 2) exhibit (i) higher Fiber Tear (≥80%) in the range of −20° C. to 60° C., and (ii) higher a Heat Stress (≥64° C.) than the comparative compositions containing EVA (CS.1) or GA 1950 only (CS.2) or GA 1950 and GA 1000R (CS.3 and CS.4), or GA 1950 and the MAH grafted ethylene-based polymer, as noted, with lower grafts per chain (CS.5, CS.6, CS.7, and CS.8).

TABLE 5

Compositions and Application Performance Data for Dense Corrugated Cardboard*

|  | Ex. 3 | CS. 1 | CS. 9 | CS. 10 | CS. 11 | CS. 12 |
|---|---|---|---|---|---|---|
| AFFINITY GA 1900 | 20 | — | 40 | 20 | 20 | 20 |
| EO 1 (MAH functionalized ethylene/octene copolymer 1) | 20 | — | — | — | — | — |
| AFFINITY GA 1000R | — | — | — | 20 | — | — |
| HONEYWELL A-C 573A | — | — | — | — | 20 | — |
| HONEYWELL A-C 575A | — | — | — | — | — | 20 |
| H100W (tackifier) | 39.5 | — | 39.5 | 39.5 | 39.5 | 39.5 |
| SASOL H1 (wax) | 20 | — | 20 | 20 | 20 | 20 |
| IRGANOX 1010 (Anti-Oxidant) | 0.5 | — | 0.5 | 0.5 | 0.5 | 0.5 |
| Commercial EVA based formulation | — | 100 | — | — | — | — |
| Total | 100% | 100% | 100% | 100% | 100% | 100% |
| Melt Viscosity† @ 177° C. mPa·s | 733 | 845 | 606 | 644 | 236 | 317 |
| Heat Stress (° C.) | 60.0 | 60.0 | 42.0 | 52.0 | 48.0 | 50.0 |
| PAFT (° C.) | 58.0 | 62.4 | 54.3 | 58.8 | 62.0 | 94.2 |
| SAFT (° C.) | 89.8 | 94.6 | 92.6 | 92.2 | 59.4 | 88.0 |

TABLE 5-continued

Compositions and Application Performance Data for Dense Corrugated Cardboard*

|  |  | Ex. 3 | CS. 1 | CS. 9 | CS. 10 | CS. 11 | CS. 12 |
|---|---|---|---|---|---|---|---|
| Fiber | −20° C. | 97 | 0 | 35 | 87 | 0 | 40 |
| Tear | 0° C. | 97 | 0 | 35 | 97 | 0 | 0 |
| (%)‡ | 23° C. | 100 | 9 | 97 | 100 | 62 | 94 |
|  | 60° C. | 88 | 48 | 18 | 60 | 91 | 95 |

CS = Comparative Sample
*Table values are weight percent (wt %), based on the total weight of the composition
†Melt Viscosity of the composition
‡Fiber tear percentage on Dense Corrugated Cardboard The hot melt adhesive composition and application performance data for the "Dense Corrugated Cardboard" are listed in Table 5. As shown in Table 5, the composition containing the MAH functionalized ethylene/octene copolymer (Ex. 3) exhibit (i) higher Fiber Tear (≥80%) in the range from −20° C. to 60° C., and (ii) higher a Heat Stress (≥60° C.) than comparative compositions containing EVA (CS.1) or GA 1900 only (CS.9) or GA 1900 and GA 1000R (CS.10) or GA 1900 and MAH grafted ethylene-based polymer, as noted, with lower grafts per chain (CS.11, and CS.12).

What is claimed is:

1. A composition comprising an acid and/or anhydride grafted ethylene/alpha-olefin interpolymer that comprises the following properties:
   A) number of grafts per polymer chain≥1.80, and
   B) melt viscosity (at 177° C.)≤50,000 mPa·s; and
   wherein the composition has a Fiber Tear≥80%, in the range from −20° C. to 60° C., when bonded to a UV cured coated substrate; and
   wherein the acid and/or anhydride grafted ethylene/alpha-olefin interpolymer has a number average molecular weight (Mn) from 9,000 to 15,000 g/mole.

2. The composition of claim 1, wherein the acid and/or anhydride grafted ethylene/alpha-olefin interpolymer is an acid and/or anhydride grafted ethylene/alpha-olefin copolymer.

3. The composition of claim 1, wherein the acid and/or anhydride grafted ethylene/alpha-olefin interpolymer has a density from 0.855 to 0.900 g/cc.

4. The composition of claim 1, wherein the acid and/or anhydride grafted ethylene/alpha-olefin interpolymer has a melt viscosity (177° C.) from 5,000 to 30,000 mPa·s.

5. The composition of claim 1, wherein the acid and/or anhydride grafted ethylene/alpha-olefin interpolymer is a maleic anhydride grafted ethylene/alpha-olefin interpolymer.

6. The composition of claim 1, wherein the acid and/or anhydride grafted ethylene/alpha-olefin interpolymer is present in an amount from 5 wt % to 60 wt % based on the weight of the composition.

7. The composition of claim 1, further comprising a tackifier and a wax.

8. The composition of claim 1, wherein the composition has a Heat Stress≥40° C. when bonded to a UV cured coated substrate.

9. An article comprising at least one component formed from the composition of claim 1.

10. The composition of claim 1, wherein the composition has a melt viscosity (177° C.) from 900 to 3,000 mPa·s.

11. The composition of claim 10, wherein the acid and/or anhydride grafted ethylene/alpha-olefin interpolymer has a melt viscosity (177° C.) from 14,000 to 24,000 mPa·s.

12. The composition of claim 10, wherein the acid and/or anhydride grafted ethylene/alpha-olefin interpolymer has a melt viscosity (177° C.) from 16,000 to 22,000 mPa·s.

13. The composition of claim 10, wherein the acid and/or anhydride grafted ethylene/alpha-olefin interpolymer is present in an amount from 10 wt % to 50 wt % based on the weight of the composition.

14. The composition of claim 11, wherein the acid and/or anhydride grafted ethylene/alpha-olefin interpolymer is present in an amount from 15 wt % to 45 wt % based on the weight of the composition.

15. An article comprising at least one component formed from the composition of claim 10.

16. An article comprising at least one component formed from the composition of claim 4.

17. The composition of claim 1, wherein the acid and/or anhydride grafted ethylene/alpha-olefin interpolymer is an ethylene/alpha-olefin copolymer that comprises a number of grafts per polymer chain from 2.00 to 3.50, and a melt viscosity (at 177° C.) from 14,000 to 24,000 mPa·s, and a number average molecular weight (Mn) from 10,000 to 15,000 g/mole.

* * * * *